United States Patent [19]

Wittnebel

[11] Patent Number: 4,711,816

[45] Date of Patent: Dec. 8, 1987

[54] TRANSPARENT SHEET MATERIAL FOR ELECTROSTATIC COPIERS

[75] Inventor: Bruce W. Wittnebel, White Bear Lake, Minn.

[73] Assignee: Minnesota Mining and Manufacturing Company, St. Paul, Minn.

[21] Appl. No.: 846,274

[22] Filed: Mar. 31, 1986

[51] Int. Cl.[4] .............................................. B32B 27/36

[52] U.S. Cl. ................................ 428/412; 346/135.1; 427/108; 427/121; 428/473.5; 428/483; 428/480; 428/515; 428/518

[58] Field of Search ..................... 428/412, 473.5, 483, 428/480, 515, 518; 346/135.1; 427/108, 121

[56] References Cited

U.S. PATENT DOCUMENTS

| | | | |
|---|---|---|---|
| 3,154,432 | 10/1964 | Herrick | 117/211 |
| 3,245,833 | 4/1966 | Trevoy | 117/201 |
| 3,933,516 | 1/1976 | Mackey | 106/131 |
| 4,089,997 | 5/1978 | Van Paesschen et al. | 427/171 |
| 4,214,035 | 7/1980 | Heberger | 428/340 |
| 4,306,996 | 12/1981 | Windhager | 252/500 |
| 4,480,003 | 10/1984 | Edwards et al. | 428/329 |
| 4,543,285 | 9/1985 | Thoese | 428/201 |

*Primary Examiner*—Marion C. McCamish
*Assistant Examiner*—C. Buczek
*Attorney, Agent, or Firm*—Donald M. Sell; James A. Smith; David L. Weinstein

[57] ABSTRACT

Transparency sheet material for use in a plain paper electrostatic copiers comprising (a) a flexible, transparent, heat resistant, polymeric film base, (b) an image receiving layer carried upon a first major surface of the film base, and (c) a layer of electrically conductive prime coat interposed between the image receiving layer and the film base. This sheet material can be used in either powder-toned or liquid-toned plain paper copiers for making transparencies.

11 Claims, 2 Drawing Figures

TRANSPARENT SHEET MATERIAL FOR ELECTROSTATIC COPIERS

BACKGROUND OF THE INVENTION

This invention relates to a construction of a transparent sheet material suitable for making transparencies in plain paper electrostatic copiers. More particularly, it relates to a transparent sheet which utilizes a layer of an electrically conductive prime coat to minimize jamming of the sheet in an electrostatic copier.

As is well known, transfer electrostatic copying commonly involves imparting a uniform electrostatic charge, either positive or negative, depending on the specific machine under consideration, to a photoconducting surface that will hold a charge only in the dark, such as a selenium-coated drum. The charge may be imparted to the photoconducting surface by passing it under a series of corona-discharge wires in the dark. The photoconducting surface is then exposed through a lens system to a document or article bearing the image which is to be reproduced. In areas where light strikes the photoconducting surface, the charge is dissipated and flows off through a conducting support to ground, with the electrostatic charge remaining largely intact in the image areas. Next, oppositely charged toner material is brought into contact with the photoconducting surface, and the toner clings by electrostatic attraction to the charged areas of the surface. A sheet which is to receive the image is placed over the toner image, and is given a charge, such as by means of corona-discharge wires. As a result, a large portion of the charged toner on the photoconducting surface is transferred to the sheet. Finally, the toner is fused to the sheet by application of heat, pressure, or a combination of both.

When transparent, polymeric sheets are imaged in a conventional electrostatic copying machine, static charge on the surfaces of the sheets causes them to jam the machine or to pass through the machine without having an image formed thereon. Jamming can be caused by multiple feeding of sheets, i.e. more than one sheet entering the imaging zone of the copier at the same time. Multiple feeding can result from two or more sheets clinging together on account of static charge or excessively high coefficient of friction. While excessively high coefficient of friction can be reduced by proper selection and/or treatment of the surface material of the transparency sheet, it is desired to provide treatment to the transparent sheet material to reduce static charge, thus resulting in fewer jams and fewer unimaged sheets.

Sheets formed of polymeric material can acquire static charge in several ways. Static electricity is generated during the extrusion, coating, and sheeting steps employed in preparing the sheets. Surface ions, from surrounding air, can induce static charge on the surface of the sheet. Ions or electrons may also be present within the backing of coated sheets or within the coatings themselves. Finally, there may be a dipole charge resulting from differences in polarity of portions of the polymeric chain forming the polymeric sheet.

SUMMARY OF THE INVENTION

This invention involves transparent sheet material for use in plain paper electrostatic copiers. The base of the sheet material is a flexible, transparent, heat resistant, polymeric sheet. Upon at least one major surface of the base is coated a layer of an electrically conductive prime coat. Over the prime coat layer is coated an image receiving layer formed of a toner-receptive, thermoplastic transparent polymer and containing electrically conductive material dispersed therein. The prime coat layer should provide suitable adhesion of the image receiving layer to the sheet base. The surface resistivity of the image receiving layer can range from about $1.7\times10^{10}$ to about $7\times10^{12}$ ohms per square. The surface resistivity of the layer of conductive prime coat material can range from about $1.7\times10^{10}$ to about $7\times10^{12}$ ohms per square. Optionally, the image receiving layer can be overcoated with a protective coating to control abrasion, resistance, roughness, and slip properties of the sheet material.

DETAILED DESCRIPTION

Figure 1:
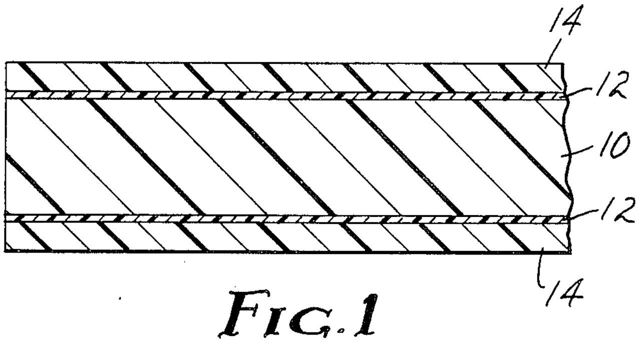
FIG. 1 is a cross-sectional view of the transparent sheet material of this invention, comprising a polymeric base, both major surfaces of which are coated with a layer of conductive prime coat, which in turn are overcoated with an image receiving layer.
Figure 2:
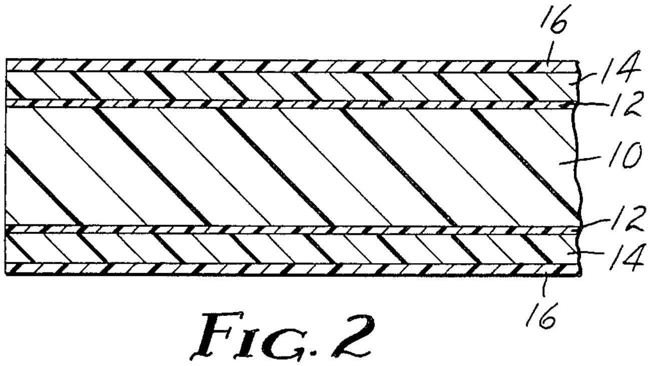
FIG. 2 is a cross-sectional view of the transparent sheet material of this invention, comprising a polymeric base, both major surfaces of which are coated with a layer of conductive prime coat, which in turn are overcoated with an image receiving layer, said image receiving layers being overcoated with a protective coating.

Referring now to FIGS. 1 and 2, the transparent sheet material of the present invention comprises:

(1) a film sheet base 10, made of a flexible, transparent, heat resistant, polymeric material, (2) a layer of electrically conductive prime coat 12 coated upon at least one major surface of said film sheet base, (3) an image receiving layer 14 coated upon the surface of said prime coat layer, and (4) an optional protective coating layer 16, overcoated upon the image receiving layer.

The film sheet base 10 must have the proper degree of transparency for use in overhead projection, i.e., it must be transparent to visible light. It preferably has sufficient heat resistance to withstand a temperature of about 120° C. to about 200° C. in order to withstand the imaging and fusing operations of a conventional plain paper copier. Suitable materials for the film sheet base include polyesters, cellulosics, e.g., cellulose triacetate, polyimides, polycarbonates, and polysulfones, the preferred material being oriented, preferably biaxially oriented, polyethylene terephthalate film. The thickness of the film sheet base may range from about 0.001 to about 0.010 inch, the preferred thickness being about 0.003 to about 0.004 inch. The surface resistivity of the film sheet base should exceed $1\times10^{13}$ ohms/sq., and preferably exceeds $1\times10^{16}$ ohms/sq.

The layer of prime coat 12 serves the dual function of adhering the image receiving layer to the film sheet base and providing sufficient electrical conductivity to reduce malfunctions due to static charge in plain paper copiers. The prime coat layer must be transparent to visible light. Materials that are suitable for the prime coat layer include gelatin, polyesters, homopolymers and copolymers of vinylidene chloride, and copolymers of vinyl acetate and vinyl chloride. When the film sheet base is polyethylene terephthalate, the preferred prime coat layer materials are homopolymers and copolymers of vinylidene chloride, hereinafter PVDC. Materials that are suitable for imparting electrical conductivity to the prime coat layer include conventional antistatic agents (hereinafter antistats), such as, for example, nitrogen compounds such as long chain amines, amides and quaternary ammonium salts; esters of fatty acids and their derivatives; sulfonic acids and alkyl aryl sulfonates; polyoxyethylene derivatives; polyglycols and their derivatives; polyhydric alcohols and their derivatives; phosphoric acid derivatives; metals; or semiconductors. These agents are well-known and are described in Encyclopedia of Chemical Technology, 3rd ed., Vo. 3, John Wiley & Sons (New York: 1978), pp. 149–183, incorporated herein by reference. Preferred antistats include soluble organic salts, such as, for example, nitrates, sulfates, and ammonium salts, with ammonium salts being preferred. A representative example of prime coat layer material is a copolymer derived from vinylidene chloride monomer units and methyl acrylate monomer units, and containing stearamidopropyldimethyl-beta-hydroxyethylammonium nitrate ("Cyastat" SN) as the conductivity-imparting material.

The coating density of the prime coat layer can range from about 5 to about 60 mg/ft$^2$, and preferably ranges from about 15 to about 25 mg/ft$^2$. The prime coat layer can be applied by conventional coating techniques, and is preferably applied by means of air-knife coating. Preferably, the prime coat layer is applied as a latex emulsion. The surface resistivity of the prime coat layer must be below $1\times10^{13}$ ohms/sq, and preferably ranges from about $1.7\times10^{10}$ to about $7\times10^{12}$ ohms/sq.

The image receiving layer 14 is essentially an electrically conductive polymeric coating overlying and adhering to the layer of prime coat 12. Like the film sheet base and prime coat, the image receiving layer 14 must be transparent to visible light. It preferably exhibits low friction against adjacent sheets and against fixed surfaces in the paper paths of copying machines. It preferably has a high resistance to finger printing and other handling problems such as scratching. Suitable materials for the image receiving layer 14 include polyesters, cellulosics, polyvinyl acetates, polyvinyl chlorides, copolymers of vinyl chloride and vinyl acetate, acrylonitrile-butadiene-styrene terpolymers, polyvinylidene chlorides, polyurethanes, polymethacrylates, polymethylmethacrylates, polymers derived from the reaction product of pyridine and 2-amino pyridine with partially chloromethylated polystyrene, as described in U.S. Pat. No. 4,480,003, incorporated herein by reference, and other thermoplastic or cross-linked resins. The preferred material for the image receiving layer is polymethyl methacrylate. The image receiving layer 14 must contain a material which imparts electrical conductivity thereto. Materials that are suitable for imparting electrical conductivity are the same as those that are useful for imparting electrical conductivity to the prime coat layer.

The image receiving layer 14 preferably contains a roughening agent to provide sufficient roughness to aid in sliding one sheet of transparency film off the top of a stack of similar sheets. Suitable roughening agents for the image receiving layer include amorphous silica, alumina hydrate, calcium carbonate, magnesia, and urea-formaldehyde polymer particles.

The coating density of the image receiving layer 14 may range from about 10 to about 1000 mg/ft$^2$ and is preferably about 150 mg/ft$^2$. The image receiving layer 14 may be applied by conventional coating techniques, and is preferably applied by roll coating. Suitable solvents for coating include acetone, ethyl acetate, methyl ethyl ketone, methylene chloride or blends thereof with such diluents as toluene or xylene. The surface resistivity of the image receiving layer can range from about $1.7\times10^{10}$ to about $7\times10^{12}$ ohms/sq. Increasing the concentration of electrical conductivity-imparting material generally increases electrical conductivity of the image receiving layer.

The surface resistivity values set forth herein can be determined in accordance with ASTM D 257-78. The apparatus employed to measure the surface resistivity include (a) Model 6105 Resistivity Adapter, (b) Model 2401 High Voltage Supply, and (c) Model 410 A Picoammeter, all manufactured by Keithley Instruments, Inc., Cleveland, Ohio. The temperature at the time of measurement is 21±3° C.; the relative humidity at the time of measurement is 30±10%. The sample size is $3\frac{1}{2}$ inch by $3\frac{1}{2}$ inch. Resistivity is measured at 100 volts. One skilled in the art can readily employ the Keithley apparatus to reproduce the foregoing measurements.

A transparent polymer or resin may be used to provide a protective coating 16 over the image receiving layer 14. The surface resistivity of the material for the protective coating layer 16 is not critical, when measured by itself. However, when coated upon the image receiving layer 14, the surface resistivity of the composite coating, i.e. the image receiving layer 14 overcoated with the protective coating layer 16, should range from about $1.7\times10^{10}$ ohms/sq. to about $7\times10^{12}$ ohms/sq., as measured by standard procedures under the conditions, and with the apparatus, previously set forth. The polymeric material of the protective coating layer 16 must be transparent to visible light and must adhere to the image receiving layer 14. In addition, it should exhibit low friction against adjacent sheets and against fixed surfaces in the paper paths of copying machines, and it should also have a high resistance to finger printing and other handling problems such as scratching. The protective coating 16 is not necessary if the material of image receiving layer 14 is non-migrating, highly resistant to scratching and finger printing, and has proper sliding properties. A non-migrating coating is one which does not transfer to adjacent objects.

Suitable resins for the protective coating layer 16 include polyesters, polystyrene derivatives, polymers and copolymers of vinyl chloride, polymers and copolymers of vinyl acetate, acrylic polymers, polyurethanes, and acrylonitrile-butadiene-styrene copolymers. In order to reduce the friction of layer 16 against adjacent sheets and against machine parts, a friction reducing agent can be added to the resin. Suitable friction reducing agents include amorphous silica, urea formaldehyde, lubricants such as silicones, mineral oil, fatty acids, and fatty alcohols. The protective coating layer 16 may be applied by conventional coating techniques from conventional coating solvents such as toluene and methyl ethyl ketone. The protective coating layer 16 may also contain a roughening agent to aid in sliding a sheet of the transparent film off the top of a stack of similar sheets. Suitable roughening agents include those that are suitable for the image receiving layer.

Preferred methods for preparing each of the component coatings or layers of the transparent sheet material is described below:

Preparation of the Transparncy Film Base 10

The film base 10 is preferably a biaxially oriented polyethylene terephthalate film. The film base may be used without any treatment.

Preparation of Prime Coat Layer 12

A typical coating composition can be prepared by mixing the following ingredients in the amounts indicated:

Emulsion comprising 90% polvinylidene chloride: 8% itaconic acid: 2% ethylacrylate (27.9% solids): 15.5 to 17.5 parts by weight Surfactant: 0.4 part by weight Water, distilled: 3 to 4 parts by weight The emulsion, surfactant, and water are mixed together until uniform, giving a pH of about 1.3. Approximately 0.125 part by weight ammonium hydroxide is added to the mixture, to raise the pH to about 7.6. Approximately 0.134 to 0.176 part by weight antistat (conductivity-imparting material) is then added to the mixture as it is being stirred. The pH is preferably about 7.2 to 7.7. The resulting mixture can then be coated onto film base 10 and dried such that the coating weight may range from about 5 to about 60 mg/ft$^2$.

Preparation of Image Receiving Layer 14

The roughening agent is dispersed in the solution of the dissolved polymeric coating material. A typical dispersion will contain the following ingredients in the amounts indicated:

Solvent: 50 to 99 parts by weight

Polymer: 1 to 50 parts by weight

Conductivity-imparting material: as needed to provide appropriate surface resistivity.

Roughening Agent: up to 25 parts by weight per 100 parts by weight polymer.

The roughening agent can be dispersed by homogenizing the entire solution. The dispersion can then be coated onto the exposed surface of the layer of the electrically conductive prime coat 12 and dried such that the coating weight may range from about 10 to about 1,000 mg/ft$^2$.

Although both the prime coat layer and the image receiving layer may exhibit the same value of surface resistivity, the concentration of conductivity-imparting material in the prime coat layer will be greater than the concentration of conductivity-imparting material in the image receiving layer.

Preparation of Protective Coating Layer 16

The roughening agent is dispersed in a solution of the dissolved resinous coating material. A typical dispersion will contain the following ingredients in the amount indicated:

Solvent 50 to 99 parts by weight

Resin: 1 tò 50 parts by weight

Roughening Agent: up to 25 parts by weight per 100 parts by weight resin

Lubricant: up to 10 parts by weight per 100 parts by weight resin

Conductivity-imparting material: as needed to provide appropriate surface resistivity The roughening agent can dispersed by homogenizing the entire solution. The dispersion can then be coated over the image receiving layer 14 and dried such that the coating weight may range from about 10 to about 1000 mg/ft$^2$. As stated previously, a protective coating layer 16 is required only in the case in which the image receiving layer has low resistance to abrasion or fingerprinting.

The transparent sheet material of this invention can be used to make good transparencies on a wide variety of both wet and dry toner machines. Typical characteristics are:

Coefficient of friction of image 0.10 to 0.70 receiving layer to protective coating layer Sheffield smoothness, image receiving 5 to 100 layer Sheffield units Sheffield smoothness, protective coating 5 to 100 layer Sheffield units The following, non-limiting example serves to describe the method of preparing the novel sheet of this invention and the properties thereof.

EXAMPLE 1

A polyvinylidene chloride (PVDC) emulsion (20.806 parts by weight, 30% solids) was mixed with 0.312 parts by weight surfactant ("Triton" X-200) until uniform. The pH of the mixture was 1.28. As the mixture was stirred, sufficient ammonium hydroxide solution (28% aqueous $NH_4OH$) was added to raise the pH to 7.58. Deionized water (4.163 parts by weight) and 0.169 parts by weight of a 50:50 mixture of antistats stearamidopropyldimethyl $\beta$-hydroxyethyl ammonium nitrate ("Cyastat" SN, American Cyanamid Corporation) and N,N-bis-(2-hydroxyethyl)-N-(3′-dodecyl-oxy-2-hydroxypropyl) methylammonium methosulfate ("Cyastat" 609, American Cyanamid Corporation) were mixed until uniform. The solution containing the anti-stats was then added slowly to the PVDC mixture. The pH of the resulting mixture was maintained between 7.2 and 7.7.

The foregoing mixture was air-knife coated onto 4 mil polyethylene terephthalate film (Scotchpar$^R$, available from Minnesota Mining and Manufacturing Co.) at a coating weight of 36 to 40 mg/ft$^2$. Both major surfaces of the film were coated. The surface conductivity was $1.7\times10^{-10}$ to $6.0\times10^{-10}$ Amps/100 volts. Haze was 9.5% .

The coating solution for preparing the image receiving layer contained the following ingredients in the amounts indicated:

| Ingredient | Amount (parts by weight) |
|---|---|
| Methylethylketone | 43.312 |
| Toluene | 43.312 |
| Polymethyl methacrylate ("Elvacite" 2041, E. I. DuPont de Nemours and Co.) | 13.000 |
| Pulverized urea formaldehyde ("Pergapak" M2, Martinswerk, West Germany) | 0.181 |
| Antistat ("Cyastat" SN) | 0.098 |
| Antistat ("Cyastat" 609) | 0.098 |

The solution for preparing the image receiving coating was applied over the (dried) prime coats with a rotogravure coater, 120 line knurl. The coating weight was 0.16 g/sq.ft. The surface conductivity was $0.1\times10^{-8}$ to $0.2\times10^{-8}$ Amps/100 volts. Haze was 9.7%.

The finished sheets were evaluated with two different Xerox ® copying machines. The results of the evaluation are set forth in the following table.

TABLE

| | Xerox ® 3107 | | Xerox ® 5400 | |
|---|---|---|---|---|
| Sheet | Jams per 100 sheets | Unimaged sheets per 100 sheets | Jams per 100 sheets | Unimaged sheets per 100 sheets |
| Control[1] | 18 | 14 | 4 | 23 |
| Example 1 | 0 | 9 | 1 | 2 |

[1]The control transparency Sheet was the same as the transparency sheet of Example 1, with the exception that in the control transparency sheet, antistats were not introduced into the prime coat layer formulations.

From the foregoing Table, it can be seen that by employing an electrically conductive prime coat, the rate of jams per 100 sheets dropped significantly and the number of unimaged sheets per 100 sheets also dropped significantly.

Various modifications and alterations of this invention will become apparent to those skilled in the art without departing from the scope and spirit of this invention, and it should be understood that this invention is not to be unduly limited to the illustrative embodiments set forth herein.

I claim:

1. Transparent sheet material comprising:

(a) a flexible, transparent, heat resistant, polymeric film sheet base, (b) a layer of electrically conductive prime coat coated upon at least one major surface of said film sheet base, said prime coat having a surface resistivity below $1\times10^{13}$ ohms/square, and (c) an electrically conductive image receiving layer coated upon the surface of said prime coat layer, said image receiving layer having a surface resistively from about $1.7\times10^{10}$ to about $7\times10^{12}$ ohms/square.

2. The sheet material of claim 1 wherein the surface resistivity of the film sheet base is at least $1\times10^{13}$ ohms/sq.

3. The sheet material of claim 1 wherein the surface resistivity of the prime coat layer is from about $1.7\times10^{10}$ to about $7\times10^{12}$ ohms/sq.

4. The sheet material of claim 3 wherein the electrically conductive prime coat layer comprises a polymeric material and an electrical conductivity-imparting organic salt.

5. The sheet material of claim 4 wherein the salt is selected from the group consisting of nitrates, sulfates, and ammonium salts.

6. The sheet material of claim 4 wherein said polymeric material is selected from the group consisting of gelatin, polyesters, homopolymers and copolymers of vinylidene chloride, and copolymers of vinyl acetate and vinyl chloride.

7. The sheet material of claim 4 wherein the layer comprises a copolymer derived from vinylidene chloride monomeric units and methyl acrylate monomeric units, and stearamidopropyl-dimethyl-beta-hydroxyethyl ammonium nitrate.

8. The sheet material of claim 1 wherein the film sheet base is made of a material selected from the group consisting of polyesters, polyimides, polycarbonates, polysulfones, and cellulose triacetate.

9. The sheet material of claim 1 wherein said image receiving layer comprises a polymeric material and an electrical conductivity-imparting material.

10. The sheet material of claim 9 wherein said polymeric material is selected from the group consisting of polymethylmethacrylates, polyesters, cellulosics, polyvinyl acetates, polyvinyl chlorides, copolymers of vinyl chloride and vinyl acetate, vinylnitrile-butadiene-styrene terpolymers, polyvinylidene chlorides, polyurethanes, polymethacrylates, copolymers of polystyrene or derivatives of polystyrene and pyridine or pyridines derivatives.

11. The sheet material of claim 1 further including a protective coating layer coated over the image receiving layer.

* * * * *